United States Patent
Bakker et al.

(10) Patent No.: US 10,601,256 B2
(45) Date of Patent: Mar. 24, 2020

(54) WIRELESS POWER TRANSFERS WITH FREQUENCY RANGE SCANNING

(71) Applicant: INTEGRATED DEVICE TECHNOLOGY, INC., San Jose, CA (US)

(72) Inventors: Anthonius Bakker, Morgan Hill, CA (US); Hiroji Natsuki, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 328 days.

(21) Appl. No.: 15/046,411

(22) Filed: Feb. 17, 2016

(65) Prior Publication Data

US 2017/0237290 A1    Aug. 17, 2017

(51) Int. Cl.
*H02J 50/10* (2016.01)
*H02J 50/40* (2016.01)
*H02J 50/12* (2016.01)
*H02J 50/60* (2016.01)

(52) U.S. Cl.
CPC .............. *H02J 50/40* (2016.02); *H02J 50/12* (2016.02); *H02J 50/60* (2016.02)

(58) Field of Classification Search
CPC ............. H02J 50/00; H02J 50/10; H02J 50/40
See application file for complete search history.

(56) References Cited

U.S. PATENT DOCUMENTS

| | | | | |
|---|---|---|---|---|
| 2010/0188041 A1* | 7/2010 | Mizuo | ................... | H02J 7/0021 320/108 |
| 2013/0257168 A1* | 10/2013 | Singh | ...................... | H02J 17/00 307/104 |
| 2014/0285145 A1* | 9/2014 | Patro | ..................... | H04B 5/0031 320/108 |
| 2015/0162785 A1* | 6/2015 | Lee | ......................... | H02J 17/00 307/104 |
| 2015/0326061 A1* | 11/2015 | Davison | ................ | H02J 7/0044 320/108 |

\* cited by examiner

*Primary Examiner* — Jared Fureman
*Assistant Examiner* — Michael J Warmflash
(74) *Attorney, Agent, or Firm* — Haynes and Boone, LLP

(57) ABSTRACT

A system, a circuit, and a method of wireless power transfer using a transmitter and a controller coupled to the transmitter. The controller is configured to perform operations including causing the transmitter to scan a frequency range that includes a maximum frequency and a minimum frequency. The operations further include determining one or more detections based at least on the scan of the frequency range. The detection may include a presence of one or more receivers, an absence of one or more receivers, and/or a presence of a foreign object. The operations include determining one or more further operations based on the one or more detections.

20 Claims, 10 Drawing Sheets

WIRELESS POWER TRANSFERS WITH FREQUENCY RANGE SCANNING

TECHNICAL FIELD

The present disclosure relates generally to wireless power transfers and more particularly to wireless power transfers based on scanning a frequency range.

BACKGROUND

Wireless power transfers offer a convenient technique for transferring electrical power without the use of electrical cords. As such, wireless power transfers may help reduce safety hazards associated with such electrical cords. For example, wireless power transfers may help reduce fire hazards, possibly where electrical cords may be older, worn down, or broken. Further, wireless power transfers may create more space around various electronics and workstations, thereby reducing clutter associated with having multiple cords. Thus, wireless power transfers may help prevent other safety hazards, possibly associated with people tripping or getting tangled up with electrical cords.

In various respects, wireless power transfers provide a low-hassle and cost-effective alternative to wired charging for portable electronics. For example, for electronic devices that are charged daily, wireless power transfers reduce the likelihood of misplacing wired chargers and prevent wear-and-tear associated with repeatedly plugging and unplugging multiple devices. As such, wireless power transfers have made it possible to simultaneously charge a number of devices. In particular, various devices may be charged, such as personal laptop computers, tablet devices, and smartphones, among other types of electronic devices. However, in some embodiments, large coils radiating power to charge a number of these devices may create various risks or hazards. For example, consider the presence of a foreign object, such as an object that is not capable of being charged. In such examples, the object may be proximate to the transmitter device coil to absorb power from the coil, potentially creating a fire hazard.

Accordingly, it would be desirable to provide improved wireless power transfer systems.

SUMMARY

Consistent with some embodiments, a wireless power transfer system includes a transmitter and a controller coupled to the transmitter. The controller is configured to perform operations. The operations include causing the transmitter to scan a frequency range that includes a maximum frequency and a minimum frequency. The operations include determining one or more detections based at least on the scan of the frequency range. The operations include determining one or more further operations based at least on the one or more detections.

Consistent with some embodiments, a wireless power transfer circuit includes a transmitter with a transmitter coil, and also a controller coupled the transmitter. The controller is configured to perform operations. The operations include causing the transmitter coil to scan a frequency range that includes a maximum frequency and a minimum frequency. The operations include determining one or more detections based at least on the scan of the frequency range. The operations include transitioning to one or more modes based at least on the one or more detections.

Consistent with some embodiments, a method of detection for a wireless power transfer. The method includes scanning, by a transmitter, a frequency range including a maximum frequency and a minimum frequency. The method further includes determining one or more detections associated with one or more receivers based at least on scanning the frequency range. The method further includes transitioning to one or more modes based at least on the one or more detections.

In the figures, elements having the same designations have the same or similar functions.

DETAILED DESCRIPTION

In the following description, specific details are set forth describing some embodiments consistent with the present disclosure. It will be apparent to one skilled in the art that some embodiments may be practiced with or without some or all of these specific details. The specific embodiments disclosed herein are meant to be illustrative but not limiting in any respects. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The benefits of wireless power transfers discussed herein may be enhanced when a wireless power transmitter is configured to transmit power to one or more receivers. For example, a wireless power transmitter may be provided with or within a charging pad. As such, a power receiver, such as an electronic tooth brush, a smart watch, or another device, may be placed on the charging pad and charged accordingly. The wireless power transmitter may be configured to detect one or more of such devices based on scanning within a selected frequency range. For example, the wireless power transmitter may detect the tooth brush by itself or with other devices, such as a smart watch. Yet further, the wireless power transmitter is also configured to detect when the devices are absent, possibly from being removed from the charging pad.

For example, the transmitter may detect the tooth brush being removed from the charging pad separately or along with also the smart watch being also being removed. In addition, the wireless power transmitter is configured for detect foreign objects, possibly referred to herein as foreign object detection (FOD). In particular, the transmitter may detect objects that are not chargeable devices, such as a user's hand, clothing, jewelry, or metallic objects, such as a curling iron. When a foreign object is present and the receiver is not present, the wireless power transmitter is configured to enter a sleep mode to reduce or eliminate the risk of transferring the wireless power to the foreign object. As such, the wireless power transmitter is configured to intelligently scan and detect chargeable devices as they are placed on or near the charging pad.

Figure 1A:
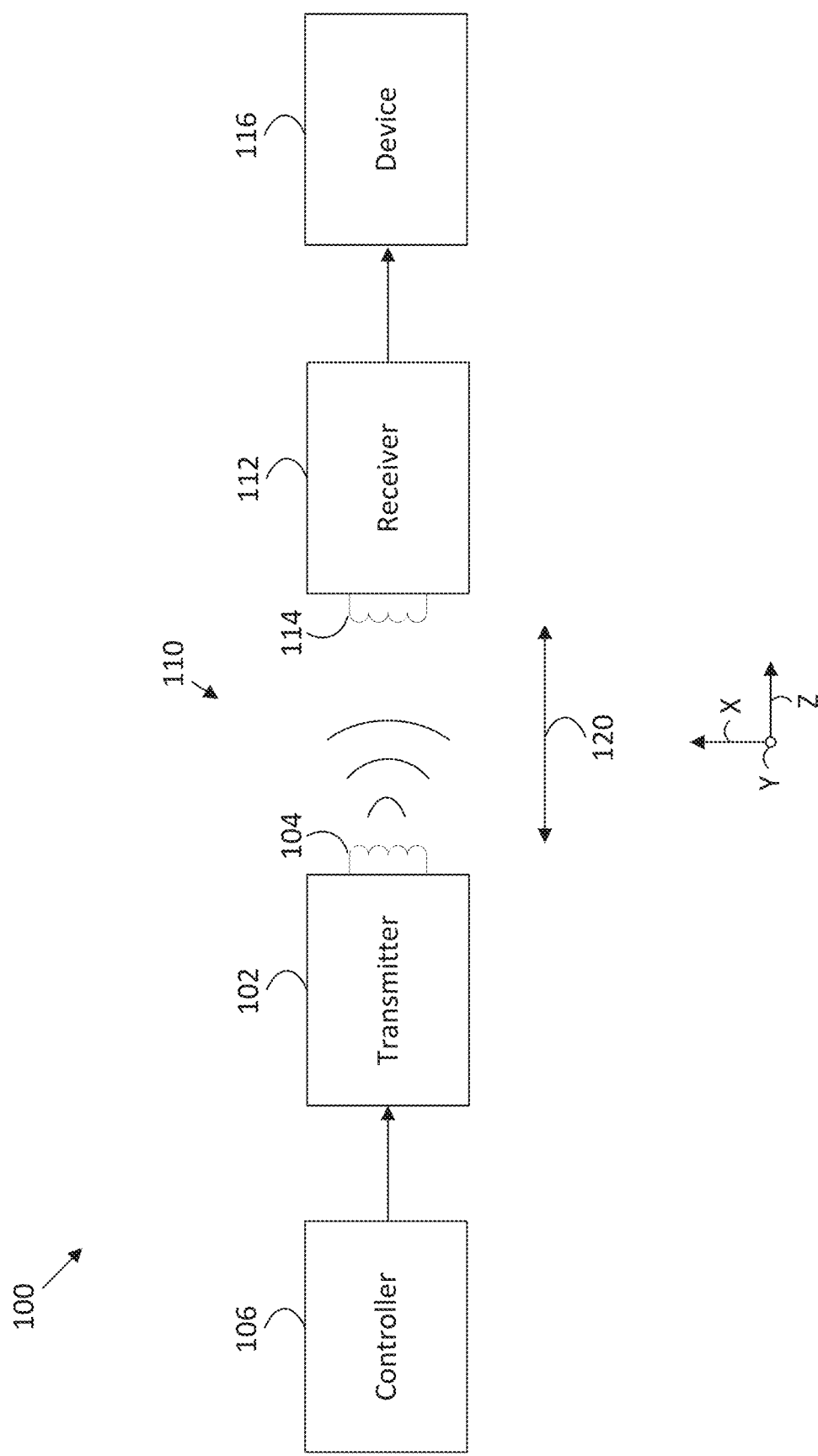
FIG. 1a is a simplified diagram of a wireless power transfer system in a one-receiver configuration according to some embodiments.

FIG. 1a is a simplified diagram of a wireless power transfer system 100 according to some embodiments. Wireless power transfer system 100 includes a transmitter 102 coupled to a transmitter coil 104. Controller 106 may be coupled to transmitter 102 to provide power and control signals to transmitter 102. Controller 106 may be integrally combined with transmitter 102 to form integrated circuitry with both controller 106 and transmitter 102. Transmitter 102 may drive transmitter coil 104 to produce a time-varying electromagnetic field 110 for wireless transmission of power.

As further depicted in FIG. 1a, wireless power transfer system 100 includes a receiver 112 coupled to a receiver coil 114. Particularly, receiver coil 114 is separated from transmitter coil 104 by a distance 120. Receiver coil 114 couples with electromagnetic field 110 to receive the wireless power transmitted from transmitter coil 104. Receiver 112 is coupled to provide power to a device 116. In some embodiments, receiver 112 may be integrally combined or incorporated within device 116 to form integrated circuitry within device 116. As such, receiver 112 delivers the received power to the device 116. Notably, transmitter coil 104 and receiver coil 114 may take various sizes, shapes, and forms according to multiple devices and applications as described or contemplated herein.

As discussed above, controller 106 also provides control signals to transmitter 102. According to some embodiments, controller 106 may include one or more control circuits for generating the control signals. The one or more control circuits may include one or more analog, digital, and/or mixed signal integrated circuits, and may further include and/or interface with components providing additional functionality, such as a processor and memory, a display, a user interface, a communication module and/or the like. In some examples, controller 106 may include a demodulator for detecting backscattered communications from device 116 or receiver 112. The communications may be used to determine the desired characteristics of the transmitted power. In some examples, controller 106 may include connections, such as one or more electrical, optical and/or wireless links for conveying analog and/or digital control signals from controller 106 to transmitter 102. Controller 106 may also supply direct current (DC) and/or alternating current (AC) power to transmitter 102. When DC power is supplied, connection may include two or more voltage rails at various voltage levels, such as a supply rail and/or a ground rail. A supply voltage of transmitter 102 may be determined based on the voltage difference between the supply rail and ground rail. Transmitter coil 104 is driven by transmitter 102 to produce electromagnetic field 110 at particular controlled frequencies for wireless transmission to receiver coil 114.

In some embodiments, transmitter coil 104 may be inductively coupled with receiver coil 114. As shown, power may be wirelessly transferred from transmitter coil 104 to receiver coil 114 over the distance 120 based on the inductive coupling. Embodiments that use inductive coupling may be particularly suitable for power transmission over short distances 120 (i.e., near-field transmission). Notably, spatial freedoms of distance 120 may include approximately twenty centimeters in the X-Y directions and approximately five centimeters in the Z direction. For power transmission over longer distances (i.e., far-field transmission), transmitter 102 may convert power into electromagnetic field 110 that is transmitted over longer distances. In some cases, transmitter coil 104 may be formed into a charging pad on which one or more receivers 112 are positioned or placed.

Receiver 112 converts electromagnetic field 110 into electrical power (e.g., AC and/or DC power). The received power is then delivered to device 116. Device 116 may include virtually any electronic device. According to some embodiments, device 116 may be any device including a toothbrush, a smart watch, a wireless headset, wireless headphones or ear buds, electronic shavers, toys, and/or other types of devices, such as wearable computing devices. Yet further, device 116 may be a mobile device, such as a smartphone, a tablet computer, a laptop computer, and/or the like. Device 116 may include energy storage components, such as batteries for storing the received power and/or may consume the received power as it is received. Device 116 may include one or more loads for consuming the received power and/or one or more repeaters for transmitting the received power to other devices. Receiver 112 and/or device 116 may include sensor and/or control circuitry for measuring the attributes of the received power and providing feedback signals to controller 106. For example, the feedback signals may be provide to transmitter 102 with independent communications channels (e.g., Bluetooth or other wireless standards) and/or with modulated backscatter signals. As such, the controller 106 may adjust the characteristics of the transmitted power based on the feedback signals received. Using backscatter communication, a feedback signal can be embedded in the time-varying electromagnetic field 110 carrying the transmitted wireless power.

Figure 1B:
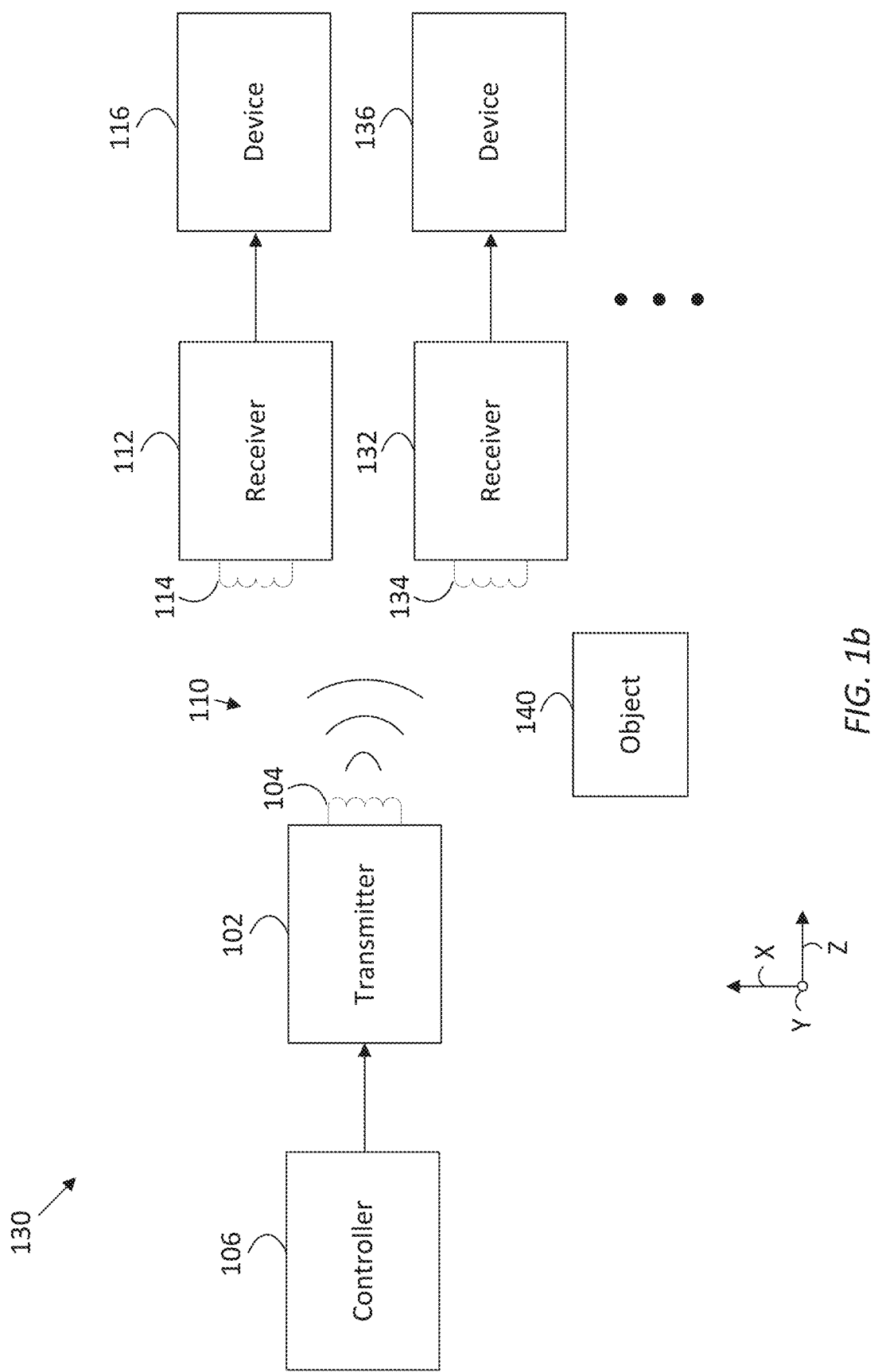
FIG. 1b is a simplified diagram of a wireless power transfer system in a multi-receiver configuration according to some embodiments.

FIG. 1b is a simplified diagram of a wireless power transfer system 130 in a multi-receiver configuration according to some embodiments. The multi-receiver configuration depicted in FIG. 1b shares many features with the one-receiver configuration depicted in FIG. 1a. However, instead of having a single receiver 112 to receive power from transmitter 102, the multi-receiver configuration has two or more receivers 112 and 132 and respective devices 116 and 136 receiving the power wireless transmitted by the transmitter 102. In particular, receiver coil 134 is configured to couple to electromagnetic field 110 such that the receiver 132 may receive power from the transmitter 102. As such, receiver 132, receiver coil 134, and device 136 may take the form of receiver 112, receiver coil 114, and device 116, respectively, as described above. Yet further, in some embodiments, the device 116 may take a different form than the device 136. For example, the device 116 may take the form of an electronic toothbrush and the device 136 may take the form of a smart watch, among other devices described or contemplated herein. Notably, other possible receivers and devices may receive power from the transmitter 102, as contemplated with the illustration of the ellipses.

In general, the transmitter 102 is configured to generate electromagnetic field 110 in the presence of one or more of receivers 112 and 132 configured to receive the wireless power transmitted. For example, the transmitter 102 may generate electromagnetic field 110 based on detecting the presence of one or more of receivers 112 and 132. Further, the transmitter 102 may also terminate electromagnetic field 110 based on detecting an absence of one or more of receivers 112 and 132. Yet further, transmitter 102 may also terminate electromagnetic field 110 based on detecting a foreign object 140, such as a person's hand or an object other than receiver 112 and 132 as described above, where the foreign object may possibly absorb the wireless power transmitted. As such, transmitter 102 may transition to a sleep mode until one or more of receivers 112 and 132 are detected or if foreign object 140 is removed. In various circumstances, some wireless power transfer systems, such as traditional or conventional systems, may not be capable of detecting one or more of receivers 112 and 132 and/or foreign object 140.

In accordance with some embodiments of the present invention, one or more of receivers 112 and 132 and/or object 140 may be detected by monitoring a power ($P_{TX}$) of transmitter 102, also referred to as the transmitted power or transmitted power level $P_{TX}$. In particular, transmitter 102 may detect one or more of receivers 112 or 132 by scanning within a specified range of frequencies. Further, the power level $P_{TX}$ may reflect or indicate the absorption of the power wirelessly transmitted from transmitter 102. One or more of receivers 112 and 132 may be configured to receive the power $P_{TX}$ based on transmitter 102 operating within the specified range of frequencies. Yet, one or more of receivers 112 and 132 are not be able to receive the power $P_{TX}$ based on transmitter 102 operating outside of the specified range of frequencies. Thus, by monitoring the power $P_{TX}$ while operating outside the specified range of frequencies, object 140 may be detected as the object absorbing the power $P_{TX}$. As such, controller 106 may operate with various modes, such as the sleep mode described further herein. Further, various modes may also include an active mode, among other possible modes described or contemplated herein.

Figure 2:
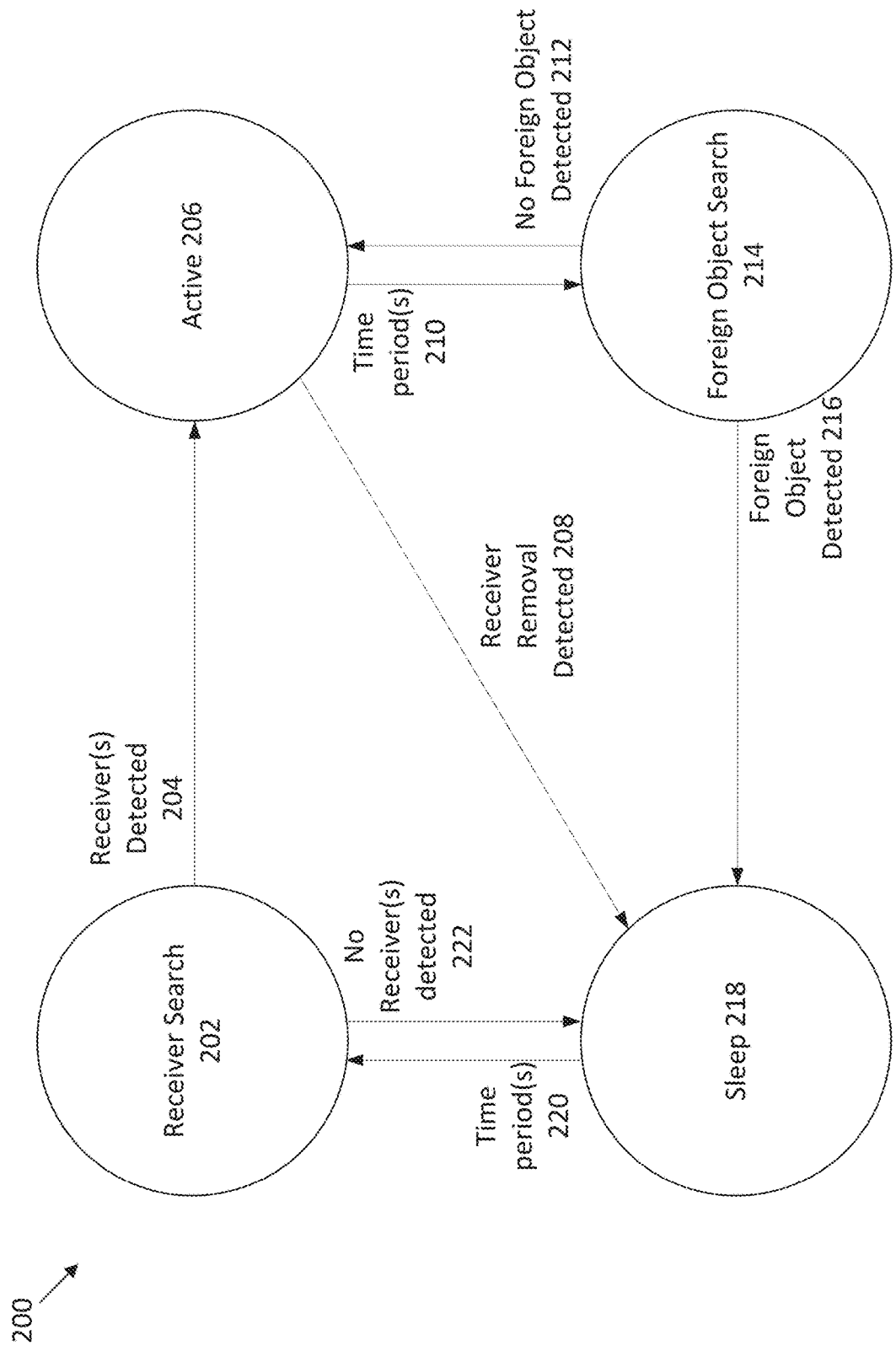
FIG. 2 is a simplified state diagram of a wireless power transfer system according to some embodiments.

FIG. 2 is a simplified state diagram 200 of a wireless power transfer system illustrates according to some embodiments. For illustrative purposes, state diagram 200 is described with transmitter 102 and controller 106, as illustrated in FIGS. 1a and 1b. Further, state diagram 200 is described with receivers 112 and 132, and foreign object 140. As shown, diagram 200 is provided with receiver search 202, active mode 206, foreign object search 214, and sleep mode 218. Yet, additional modes or operations may also be implemented in the state diagram 200, as described or contemplated herein.

With receiver search 202, controller 106 drives transmitter 102 to search for one or more of receivers 112 and 132 by scanning within a specified range of frequencies and monitoring the power $P_{TX}$ of transmitter 102. Transmitter 102 drives the transmitter coil 104 at the specified range of frequencies to provide the electromagnetic field 110. Thus, transmitter 102 may search for a presence of one or more of receivers 112 and 132 based on the power characteristics of electromagnetic field 110. In some embodiments, transmitter 102 may scan for one or more of receivers 112 and 132 based on adjusting or varying the frequency of electromagnetic field 110 in a particular pattern. As noted, the transmitter power $P_{TX}$ monitored may indicate an absorption of the power wirelessly transmitted by transmitter 102. Based on detecting the absorption of the power transmitted, the state diagram 200 may transition (receiver(s) detected 204) from the receiver search 202 to the active mode 206.

In active mode 206, controller 106 drives transmitter 102 to charge one or more of receivers 112 and 132. In particular, one or more of receiver coils 114 and 134 of receivers 112 and 132, respectively, may couple with electromagnetic field 110 to receive the wirelessly transmitted power from transmitter coil 104. In some instances, detection 208 of one or more of receivers 112 and 132 being physically removed away from electromagnetic field 110 may initiate a transition to sleep mode 218, described further herein. In some embodiments, based on one or more time periods 210, controller 106 may initiate foreign object search 214.

With foreign object search 214, controller 106 drives transmitter 102 to search for foreign objects. For example, controller 106 may drive transmitter 102 to adjust electromagnetic field 110 to a frequency outside of a specified frequency range to search for one or more foreign objects 140. In particular, based on scanning the frequency outside of the specified frequency range, each of the receivers 112 and 132 may disconnect from electromagnetic field 110 and stop receiving the power transmitted wirelessly. In such instances, the foreign object 140 absorbs the power transmitted wirelessly. Based on detection 216 of the foreign object 140, controller 106 may transition to sleep mode 218. If there is no detection 212 of foreign object 140 or detection 212 of an absence of foreign object 140, transmitter 102 may return to active mode 206 described above. As such, one or more receivers 112 and 132 may connect or reconnect with electromagnetic field 110 and one or more receivers 112 and 132 may continue being charged in active mode 206.

In sleep mode 218, controller 106 may cause transmitter 102 to sleep, causing transmitter 102 to stop driving transmitter coil 104. In such instances, electromagnetic field 110 may be terminated. Yet, in some embodiments, based on one or more time periods 220, transmitter 102 may periodically drive transmitter coil 104 to search for one or more of receivers 112 and 132, as described above. For example, receiver search 202 may be initiated to search for one or more of receivers 112 and 132. Further, if there is no detection 222 of one or more of receivers 112 and 132, e.g., detection 222 indicates an absence of one or more receivers 112 and 132, controller 106 may cause transmitter 102 to return to sleep mode 218.

It should be noted that receiver search 202, active mode 206, foreign object search 214, and sleep mode 218 are provided for purposes of illustration and explanation, and should not be interpreted as limiting in any way. For example, additional aspects of state diagram 200 may also be implemented. In particular, according to active mode 206, detection 208 of one or more of receivers 112 and 132 being physically removed may initiate receiver search 202 to search for one or more receivers 112 and 132, or other receivers. Further, according to foreign object search 214, if there is no detection 212 of foreign object 140, controller 106 may cause transmitter 102 to initiate receiver search 202 to search for one or more of receivers 112 and 132, among other possibilities.

Figure 3A:
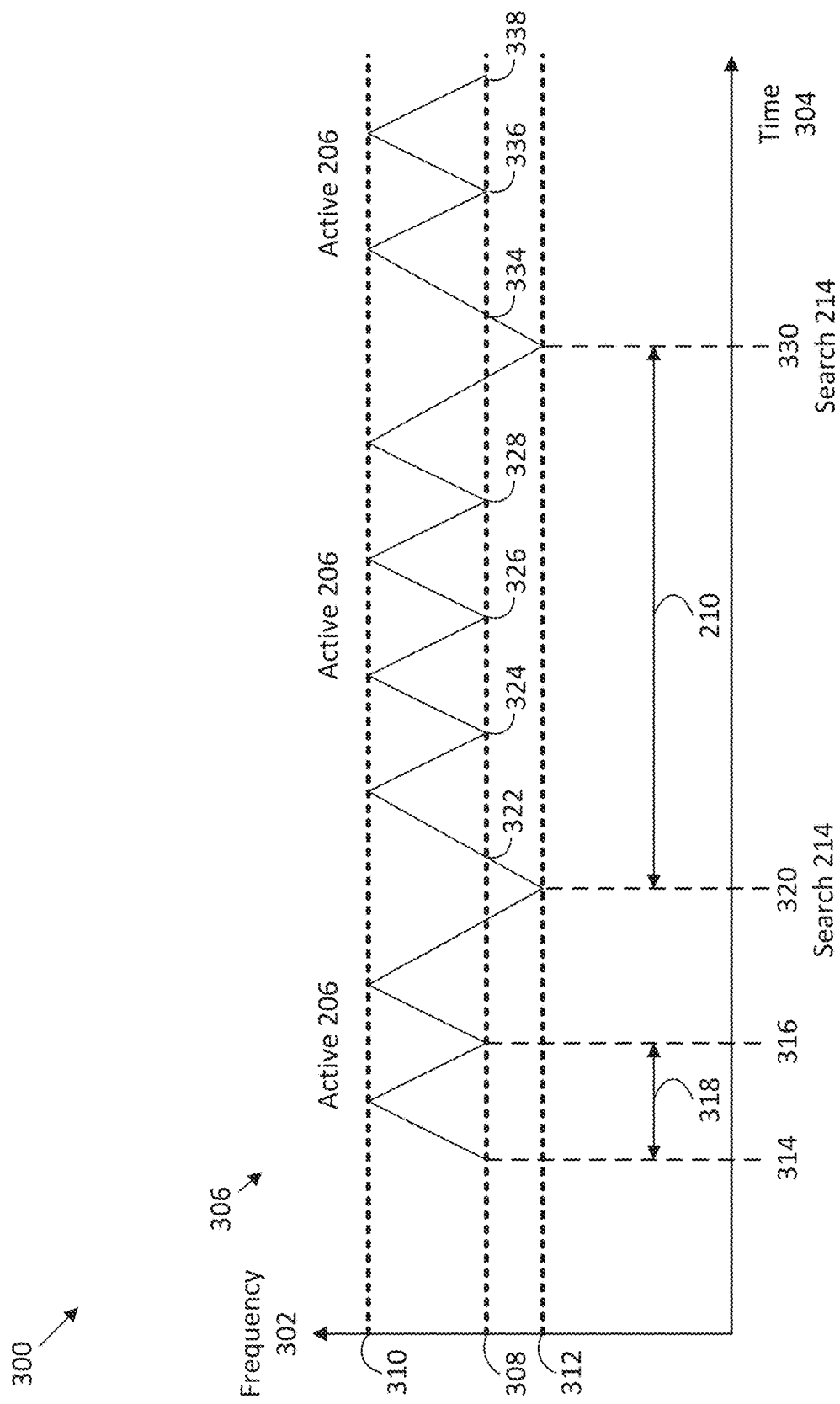
FIG. 3a is a simplified timing diagram of an active mode and a foreign object search of a wireless power transfer system according to some embodiments.

FIG. 3a is a simplified timing diagram 300 of active mode 206 and foreign object search 214 of a wireless power transfer system according to some embodiments. Timing diagram 300 provides a frequency axis 302 on the y-axis and a time axis 304 on the x-axis. According to FIGS. 1a and 1b, timing diagram 300 may correspond to wireless power transfer systems 100 and 130 charging one or more of receivers 112 and 132.

As noted, wireless transfer systems 100 and 130 may include controller 106 that is coupled to transmitter 102. Controller 106 may be configured to cause transmitter 102 to drive transmitter coil 104 to scan a range of frequencies. As shown in FIG. 3a, transmitter 102 may scan 306 a frequency range between minimum frequency 308 and maximum frequency 310. As shown in FIG. 3a, scan 306 may involve a saw-tooth scanning pattern. In particular, scan 306 is provided with a triangular-shaped scan moving or bouncing between minimum frequency 308 and maximum frequency 310 over times 314-316, 322-328, and 334-338, among other times illustrated on time axis 304. Of course, other frequencies may be scanned as well. Frequency of scan 306 may be approximately 30 hertz (Hz) with a period 318 ($T_{mod}$) of approximately 0.05 seconds.

In some embodiments, transmitter power ($P_{TX}$) described above may be measured during scan 306. Thus, controller 106 may determine one or more detections based on the power or power level $P_{TX}$ measured during scan 306 within the frequency range defined by frequency 308 and frequency 310. In particular, controller 106 may detect a presence or an absence of one or more receivers 112 and 132, objects 140, items, and/or articles that may absorb the power transmitted wirelessly. In some instances, based on detecting one or more receivers 112 and 132, power may be transmitted wirelessly with scan 306 operating at frequencies between frequency 308 and frequency 310. As such, electromagnetic field 110 may be generated based on scan 306 to charge one or more receivers 112 and 132.

As discussed above, controller 106 may cause transmitter 102 to search for one or more of receivers 112 and 132. For example, transmitter 102 may search for one or more receivers 112 and 132. Controller 106 may also detect the presence of one or more of receivers 112 and 132 based on measuring the power level $P_{TX}$ of transmitter 102. In some instances, the power level $P_{TX}$ measured may indicate a presence of one or more of receivers 112 and 132. For example, the power level $P_{TX}$ measured may be greater than or equal to a threshold power or power level $P_0$ that indicates the presence of one or more of receivers 112 and 132. In some embodiments, the power level $P_{TX}$ may be measured at times 314, 316, 324, 326, 328, 336, and 338 based on time period 318. If the power level $P_{TX}$ is greater than or equal to the power level $P_0$, then controller 106 may transition to active mode 206 to charge one or more of receivers 112 and 132.

As is discussed with respect to FIG. 2, timing diagram 300 illustrates an example of active mode 206. Consequently, as power is being transmitted wirelessly by transmitter 102 between frequency 308 and frequency 310, one or more of receivers 112 and 132 present are charged accordingly. In particular, power may be modulated by receivers 112 and 132 based on the resonant frequencies of one or more of receivers 112 and 132. Further, the power may be modulated by tuning the resonant frequencies to the transmitter frequency during scan 306 between frequency 308 and frequency 310. In some embodiments, the resonant frequencies of receivers 112 and 132 may lock on to the frequency of transmitter 102 in the frequency range from lower frequency 308 to higher frequency 310. As such, receiver coils 114 and 134 may couple with electromagnetic field 110 generated by transmitter 102. Receiver coils 114 and 134 may thereby receive the wirelessly transmitted power from electromagnetic field 110 provided by transmitter coil 104.

In some embodiments, the power level $P_{TX}$ measured may be less than the power level $P_0$ that indicates an absence of one or more of receivers 112 and 132. If the power level $P_{TX}$ is less than the power level $P_0$, then an absence of one or more of receivers 112 and 132 may be detected. In such instances, controller 106 may transition to sleep mode 218, as described further herein. According to FIG. 2, timing diagram 300 may also correspond to detection 208 of one or more of receivers 112 and 132 being physically removed from electromagnetic field 110. In particular, controller 106 may also detect an absence of one or more of receivers 112 and 132 by detecting the power level $P_{TX}$ is less the power level $P_0$ while operating between frequency 308 and frequency 310. Thus, controller 106 may transition to sleep mode 218. Thus, by terminating scan 306, one or more of receivers 112 and 132 will not be able to receive the wirelessly transmitted power.

Controller 106 may also detect the presence of foreign object 140 based on the transmitter power or power level $P_{TX}$. For example, controller 106 may detect foreign object 140 based on a comparison between the power level $P_{TX}$ and a threshold power or power level ($P_{FOD}$). In some instances, the power level $P_{TX}$ measured may be greater than the power level $P_{FOD}$, indicating a presence of object 140, described above as being capable of absorbing power transmitted wirelessly. In some instances, if the power level $P_{TX}$ is greater than the threshold power level $P_{FOD}$ based on scan 306 transitioning below frequency 308, then a presence of object 140 may be detected. As such, controller 106 may transition from active mode 206 to sleep mode 218. If the power level $P_{TX}$ is less than or equal to the threshold power $P_{FOD}$, then controller 106 may remain in active mode 206 or transition to active mode 206 to charge one or more of receivers 112 and 132.

In some embodiments, the power level $P_{TX}$ measured may be based on periodically scanning frequency 308 at times 322 and/or 334 based on time period 210. According to FIG. 2, foreign object search 214 described above may also be based on one or more time periods 210. In some instances, at least one detection may indicate a presence of foreign object 140 based at least on the power measured $P_{TX}$ at times 322 and/or 334 being greater than the threshold power $P_{FOD}$. As such, controller 106 may transition to sleep mode 218 based on a comparison between the power $P_{TX}$ and the power $P_{FOD}$. Notably, the power level $P_{FOD}$ used to detect the foreign object 140 and the power level $P_0$ used to detect one or more of receivers 112 and 132 may be the same or different threshold powers or power levels.

Additionally, it may be difficult to determine whether the power level $P_{TX}$ is greater than the threshold power level $P_{FOD}$, possibly based on a presence of one or more of receivers 112 and 132. Further, it may be difficult to measure the power level $P_{TX}$ based on the power being absorbed by object 140. As shown in FIG. 2, periodically (every time period 210 as indicated) foreign object search 214 is performed in active mode 206. As shown in FIG. 3a, transmitter 102 scans 306 frequency 312 that is outside of frequency range 308-312 defined by lower frequency 308 and higher frequency 310. Because receivers 112 and 132 are not configured to absorb power outside of frequency range 308-310, if the power level $P_{TX}$ is greater than the power level $P_{FOD}$ (or another power level based on the circumstances), then the object absorbing power is determined to be foreign object 140, as opposed to one or more of receivers 112 and 132. As shown in FIG. 2, if foreign object 140 is detected in this fashion, controller 106 transitions from foreign object search 214 to sleep mode 218.

As noted, according to modes 202 and 206 in FIG. 2, controller 106 may cause transmitter coil 104 to scan 306 the frequency range 308-310. Further, according to foreign object search 214, controller 106 may cause transmitter coil 104 to periodically scan 306 frequency 312 outside of frequency range 308-310, where frequency 312 may be approximately 70 kHz. In particular, frequency 312 may be below the minimum frequency 308, or in some instances, possibly above the maximum frequency 310. As shown, frequency 312 may be below the minimum frequency 308 or above the maximum frequency 310 by a predetermined margin, such as by 10 kHz, among other possible margins. As noted, scan 306 to frequency 312 may cause one or more of receivers 112 and 132 to disconnect from electromagnetic field 110 generated by transmitter coil 104.

Figure 3B:
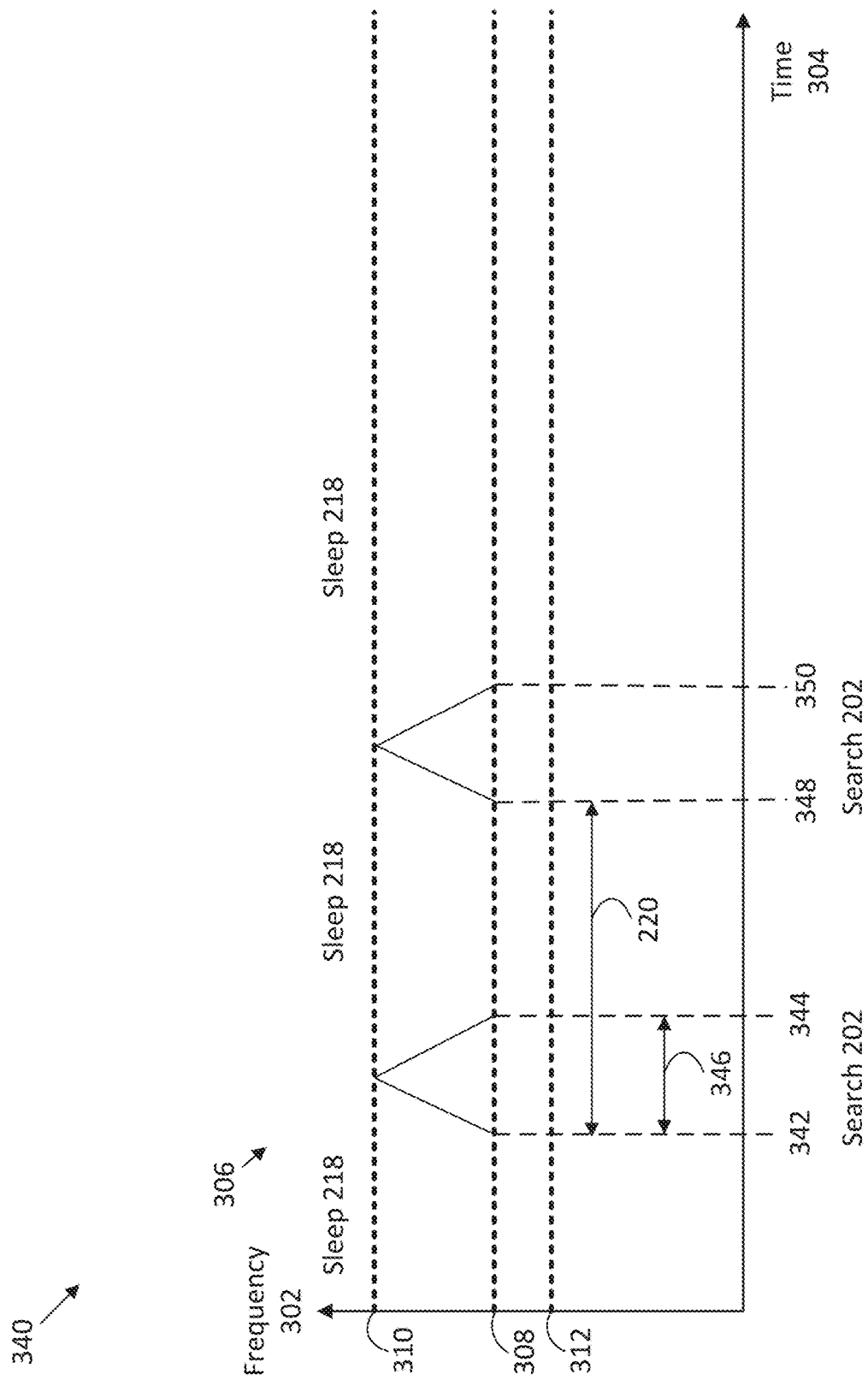
FIG. 3b is a simplified timing diagram of a sleep mode and performing a receiver search of a wireless power transfer system according to some embodiments.

FIG. 3B illustrates a simplified timing diagram 340 of sleep mode 218 and performing receiver search 202 of a wireless power transfer system according to some embodiments. Timing diagram 340 provides a frequency axis 302 on the y-axis and a time axis 304 on the x-axis, as described above in relation to the timing diagram 300. In some instances, timing diagram 340 may be an extension from timing diagram 300. For example, timing diagram 300 may illustrate active mode 206 and foreign object search 214 and timing diagram 340 may illustrate sleep mode 218 and receiver search 202. As such, timing diagram 340 may correspond to transmitter 102 periodically scanning the frequency range 308-310. As such, periodic scan 306 may involve scanning the frequency range 308-310. Further, periodic scan 306 may involve scanning frequency range 308-310 based on a period 220 ($T_{ping}$), possibly also described herein as a rest period. As shown, frequency 312 is provided for further illustrative purposes.

In sleep mode 218, transmitter 102 does not transmit wireless power, i.e., $P_{TX}$ is zero. As illustrated in FIG. 2, after a time period 220, sleep mode 218 transitions to receiver search 202 to search for one or more of receivers 112 and 132. As shown in FIG. 3B, scan 306 continues from frequency 308 to frequency 310 during receiver search 202. Scan 306 from frequency 308 to frequency 310 and back to frequency 308 may take a time period 346 ($T_{mod}$). The scan period 346 ($T_{mod}$) may be approximately 50 ms and the rest period 220 ($T_{ping}$) may be approximately 500 ms. During scan 306, the power level $P_{TX}$ is monitored and as shown in FIG. 2, controller 106 transitions to active mode 206 based on the power level $P_{TX}$ being greater than or equal to the threshold power level $P_0$. In the event that no receiver or object is detected (i.e. $P_{TX}$ is less than $P_0$ and $P_{TX}$ is less than or equal to $P_{FOD}$), controller 106 transitions to sleep mode 218 or remains in sleep mode 218. Scan 306 illustrates multiple transitions between sleep mode 218 to receiver search 202 and back to sleep mode 218.

Controller 106 may detect a foreign object, possibly while in sleep mode 218. For example, controller 106 may perform further operations to detect foreign object 140 in sleep mode 218. In particular, controller 1066 may measure the power level $P_{TX}$ associated with transmitter 102 based on scan 306 of frequency 308 shown at a time 342 in the timing diagram 340. As such, controller 106 may detect foreign object 140 based on a comparison of the power measured $P_{TX}$ being greater than or equal to the threshold power $P_{FOD}$. As such, controller 106 may continue in sleep mode 218 based on foreign object 140 detected.

Further, controller 106 may also detect an absence of one or more of receivers 112 and 132, possibly while in sleep mode 218. In particular, controller 106 may perform further operations to detect such absences in sleep mode 218. In particular, controller 106 may measure a power $P_{TX}$ associated with transmitter 106 at a time 344 in the timing diagram 340. Controller 106 may detect the absence of one or more receivers 112 and 132 based on a comparison of the power measured $P_{TX}$ with threshold power $P_0$, where the power $P_{TX}$ may be less than or equal to the threshold power $P_0$. The comparison may indicate an absence of one or more of receivers 112 and 132. As such, controller 106 may continue in sleep mode 218 based on the comparison.

Yet further, controller 106 may also detect a presence of one or more of the receivers 112 and 132, possibly while in sleep mode 218. For example, controller 106 may perform further operations to detect such presences in sleep mode 218. In particular, controller 106 may measure a power $P_{TX}$ at time 344 in timing diagram 340. Controller 106 may detect the presence of one or more receivers 112 and 132 based on a comparison of the power measured $P_{TX}$ with a threshold power $P_0$, where the power $P_{TX}$ may be greater than or equal to the threshold power $P_0$. The comparison may indicate a presence of one or more of receivers 112 and 132. As such, controller 106 may transition to active mode 206 based on the comparison.

Wireless power transfer system 100/130 may take the form of a wireless power transfer circuit, possibly referred to as the wireless power transfer circuit 100/130. Wireless power transfer circuit 100/130 includes transmitter 102 with transmitter coil 104. Wireless power transfer circuit 100/130 also includes controller 106 coupled to transmitter 102. Controller 106 is configured to perform operations, such as causing transmitter coil 104 to scan 306 the frequency range 308-310 that includes the minimum frequency 308 and the maximum frequency 310. Minimum frequency 308 may be approximately 80 kHz and the maximum frequency 310 may be approximately 100 kHz. The operations further include determining one or more detections based at least on scan 306 of the frequency range 308-310. The operations further include transitioning to one or more modes based on the one or more detections. Notably, the complexity of one or more of receivers 112 and 132 in the wireless power transfer circuit 100/130 may be reduced based on the operating in such frequency ranges, e.g., 80-100 kHz range, as opposed to conventional frequency ranges described further herein.

Figure 4:
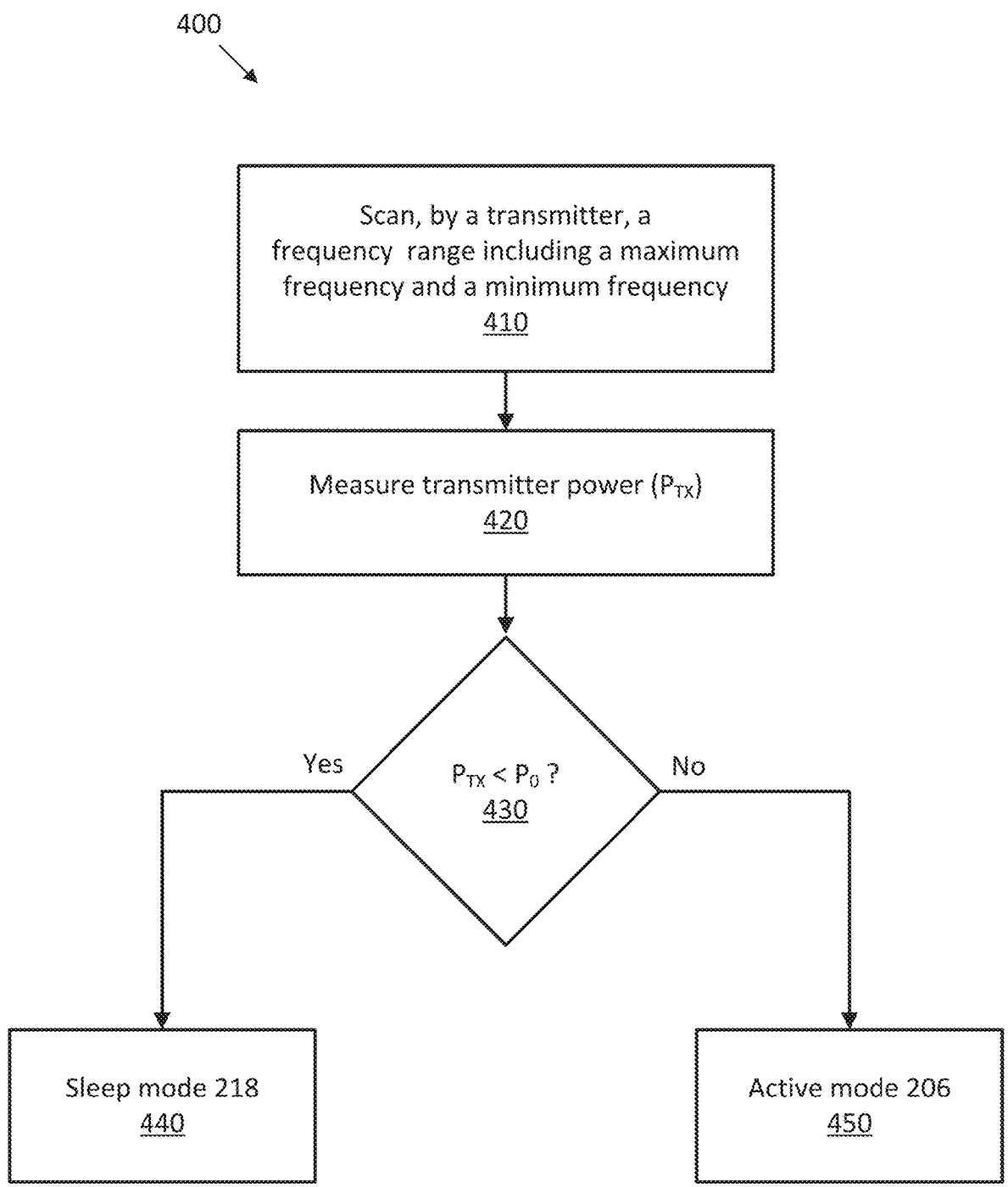
FIG. 4 is a simplified diagram of a method to perform a receiver search with a wireless power transfer system according to some embodiments.

FIG. 4 is a simplified diagram of a method 400 of a receiver search according to some embodiments. For example, a wireless power transfer system, such as wireless power transfer system 100/130, may perform method 400 to detect one or more of receivers 112 and 132. In some embodiments, a controller, such as controller 106, may perform processes of method 400. According to FIG. 2, method 400 may correspond with the receiver search 202.

At a process 410, a frequency range is scanned by a transmitter, where the frequency range includes a maximum frequency and a minimum frequency. According to FIG. 3a, transmitter 102 may scan 306 the frequency range 308-310, including the minimum frequency 308 and the maximum frequency 310. Transmitter 102 may scan 306 the frequency range 308-310 based on a user input received by the wireless power transfer system 100/130. The user input may be provided through a local (e.g. a mechanical switch) and/or remote (e.g. web-based) interface as described or contemplated herein.

At a process 420, the transmitter power $P_{TX}$ is measured. According to FIGS. 1a and 1b, the transmitter power $P_{TX}$ may indicate the absorption of the wirelessly power transmitted from transmitter 102. According to FIG. 3a, the transmitter power $P_{TX}$ may be measured at the minimum frequency 312, shown at times 314, 316, 324-328, and 336-338.

At a process 430, the transmitter power $P_{TX}$ is compared with a threshold power or power level $P_0$. As noted, the transmitter power $P_{TX}$ being less than the power level $P_0$ may indicate the absence of one or more of receivers 112 and 132. According to FIG. 2, the transmitter power $P_{TX}$ being less than the power level $P_0$ may indicate detection 222 of an absence of one or more of receivers 112 and 132. Thus, at a process 440, based on the transmitter power $P_{TX}$ being less than the power level $P_0$, controller 106 enters sleep mode 218.

Yet, the transmitter power $P_{TX}$ being greater or equal to the power level $P_0$ indicates the presence of one or more of receivers 112 and 132. Thus, at a process 450, based on the transmitter power $P_{TX}$ being greater than or equal to the power level $P_0$, controller 106 enters active mode 206.

Figure 5:
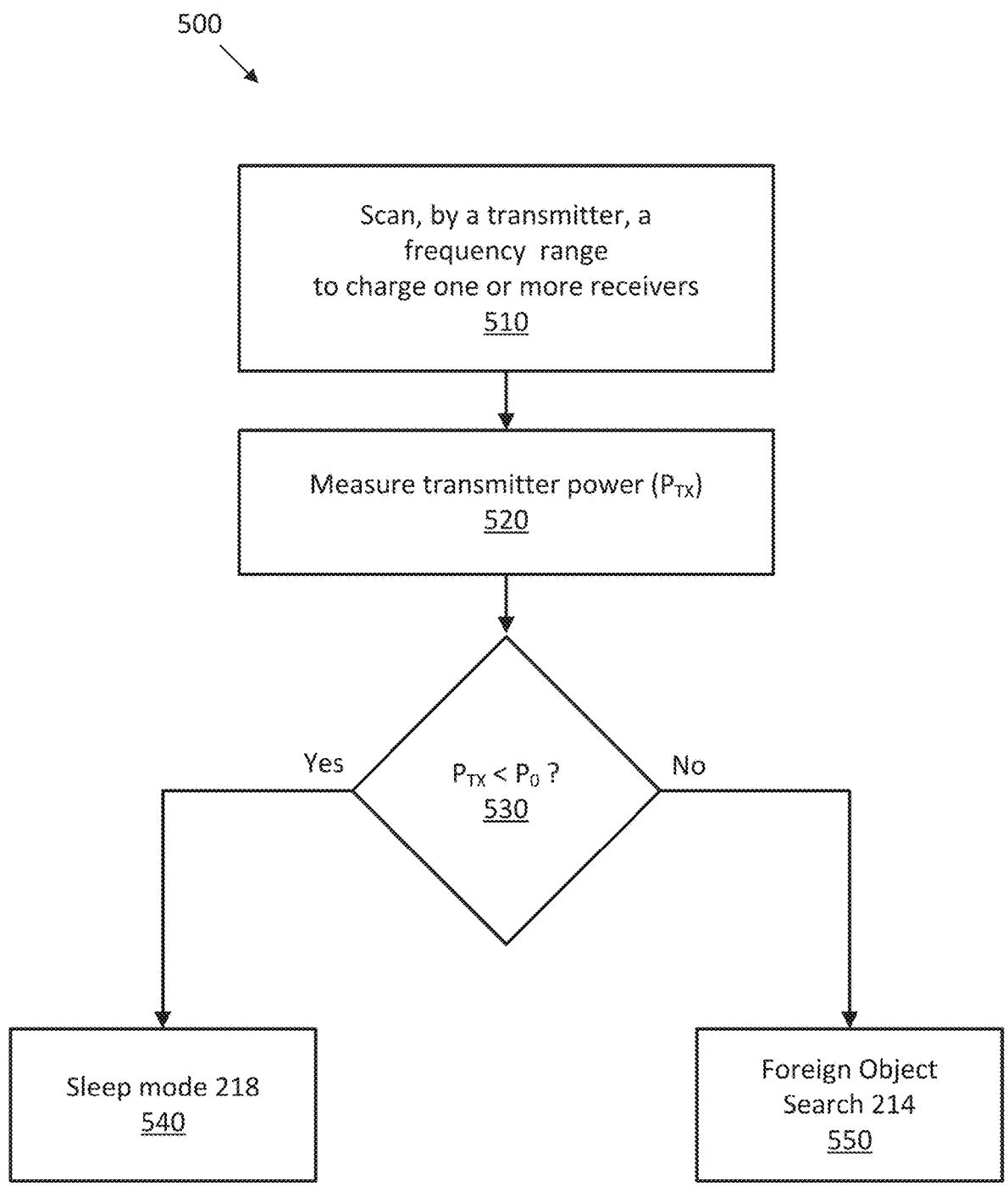
FIG. 5 is a simplified diagram of a method of an active mode of a wireless power transfer system according to some embodiments.

FIG. 5 is a simplified diagram of a method 500 of an active mode according to some embodiments. For example, a wireless power transfer system, such as wireless power transfer system 100/130, may perform method 500 to charge one or more of receivers 112 and 132. In some embodiments, a controller, such as controller 106, may perform processes of method 500. According to FIG. 2, method 600 may correspond with active mode 206.

At a process 510, a frequency range is scanned by a transmitter to charge one or more receivers. As noted, the frequency range 308-310 includes the minimum frequency 308 and the maximum frequency 310. Transmitter 102 may scan 306 the frequency range 308-310 to charge one or more of receivers 112 and 132.

At a process 520, the transmitter power $P_{TX}$ is measured. As noted, the transmitter power $P_{TX}$ may indicate the absorption of the wirelessly power transmitted from transmitter 102. According to FIG. 3a, the transmitter power $P_{TX}$ may be measured at the minimum frequency 312, shown at times 314, 316, 324-328, and 336-338.

At a process 530, the transmitter power $P_{TX}$ is compared with a threshold power or power level $P_0$. As noted, the transmitter power $P_{TX}$ being less than the power level $P_0$ indicates the absence of one or more of receivers 112 and 132, possibly from being removed from the charging pad. For example, according to FIG. 2, the transmitter power $P_{TX}$ being less than the power level $P_0$ may indicate detection 208 of one or more of receivers 112 and 132 being removed from the charging pad. Thus, at a process 540, based on the transmitter power $P_{TX}$ being less than the power level $P_0$, controller 106 enters sleep mode 218.

Yet, the transmitter power $P_{TX}$ being greater or equal to the power level $P_0$ indicates the presence of one or more of receivers 112 and 132. Thus, at a process 550, based on the transmitter power $P_{TX}$ being greater than or equal to the power level $P_0$, controller 106 remains in active mode 206.

Figure 6:
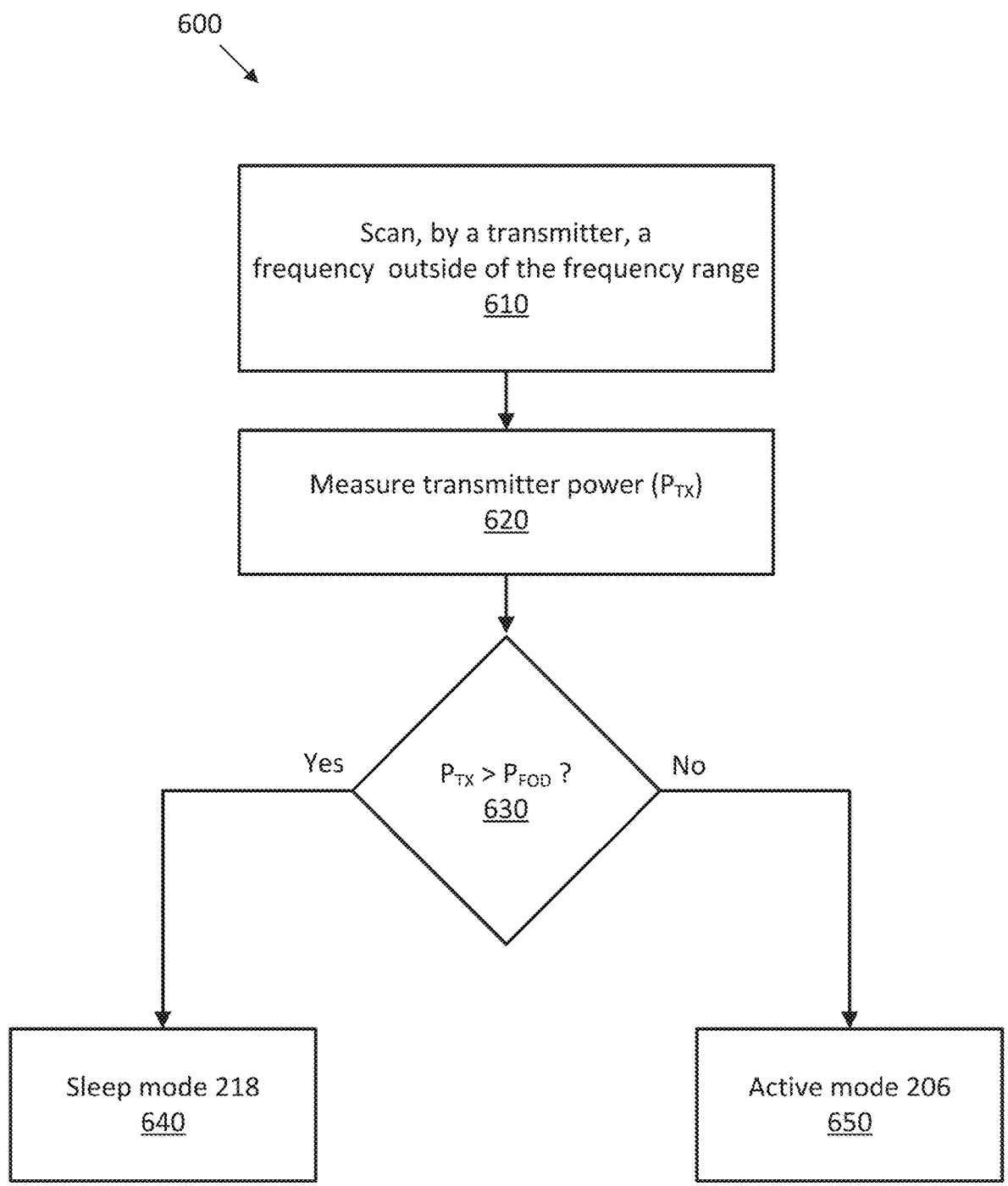
FIG. 6 is a simplified diagram of a method to perform a foreign object search with a wireless power transfer system according to some embodiments.

FIG. 6 is a simplified diagram of a method 600 of a foreign object search according to some embodiments. For example, a wireless power transfer system, such as wireless power transfer system 100/130, may perform method 600 to search for the foreign object 140. In some embodiments, a controller, such as controller 106, may perform processes of method 600. According to FIG. 2, method 600 may correspond with foreign object search 214.

At a process 610, a frequency outside of a frequency range is scanned by a transmitter to search for the foreign object. As noted, according to FIG. 3a, the frequency range 308-310 includes the minimum frequency 308 and the maximum frequency 310. Frequency 312 is outside of the frequency range 308-312. Transmitter 102 may scan 306 frequency 312 to search for foreign object 140. In particular, by scanning 306 the frequency 312, one or more of receivers 112 and 132 will disconnect from the electromagnetic field 110. As noted, frequency 312 may be scanned at times 320 and 330, based on the period 210 described above as $T_{FOD}$.

At a process 620, the transmitter power $P_{TX}$ is measured. As noted, the transmitter power $P_{TX}$ may indicate the absorption of the wirelessly power transmitted from transmitter 102. According to FIG. 3a, the transmitter power $P_{TX}$ may be measured at times 322 and 334 based on scan 306 of the minimum frequency 308.

At a process 630, the transmitter power $P_{TX}$ is compared with a threshold power or power level $P_{FOD}$. As noted, the transmitter power $P_{TX}$ being greater than the power level $P_{FOD}$ indicates the presence of the foreign object 140. According to FIG. 2, the transmitter power $P_{TX}$ being greater than the power level $P_{FOD}$ may indicate detection 216 of a presence of the foreign object 140. Thus, at a process 640, based on the transmitter power $P_{TX}$ being greater than the power level $P_{FOD}$, controller 106 enters sleep mode 218.

Yet, the transmitter power $P_{TX}$ being less than or equal to the power level $P_{FOD}$ indicates the absence of foreign object 140. Thus, at a process 650, based on the transmitter power $P_{TX}$ being less than or equal to the power level $P_{FOD}$, controller 106 enters active mode 206.

Figure 7:
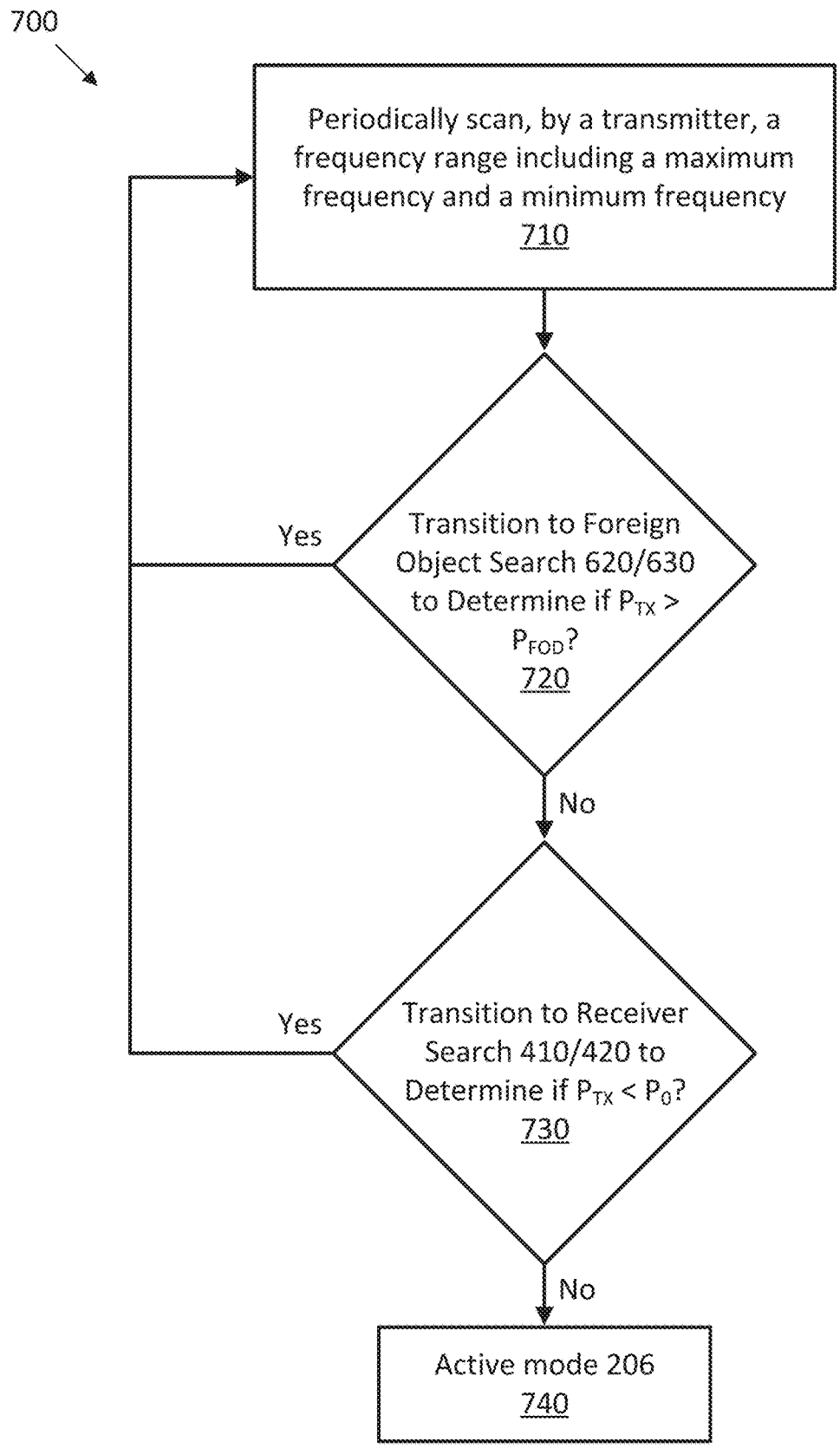
FIG. 7 is a simplified diagram of a method of a sleep mode of a wireless power transfer system according to some embodiments.

FIG. 7 is a simplified diagram of a method 700 of a sleep mode according to some embodiments. For example, a wireless power transfer system, such as wireless power transfer system 100/130, may perform method 700 in a sleep mode. In some embodiments, a controller, such as controller 106, may perform processes of method 700. According to FIG. 2, method 700 may correspond with sleep mode 218.

At a process 710, a frequency range is periodically scanned by a transmitter. As noted, according to FIG. 3b, the frequency range 308-310 includes the minimum frequency 308 and the maximum frequency 310. Transmitter 102 may periodically scan 306 the frequency range 308-310 to search for foreign object 140 and/or one or more of receivers 112 and 132.

At a process 720, a search is performed to detect foreign objects in accordance with processes 620 and 630 described above. According to FIG. 3b, the transmitter power $P_{TX}$ is measured at times 342 and 348 based on scan 306 of minimum frequency 308. As noted, the transmitter power $P_{TX}$ is compared with the power level $P_{FOD}$. The transmitter power $P_{TX}$ being greater than the power level $P_{FOD}$ indicates the presence of foreign object 140. According to FIG. 2, the transmitter power $P_{TX}$ being greater than the power level $P_{FOD}$ may indicate the detection 216 of a presence of foreign object 140. Thus, based on the transmitter power $P_{TX}$ being greater than the power level $P_{FOD}$, the method 700 returns to process 710.

Yet, the transmitter power $P_{TX}$ being less than or equal to the power level $P_{FOD}$ indicates the absence of the foreign object 140. Thus, at a process 730, based on the transmitter power $P_{TX}$ being less than or equal to the power level $P_0$, a search is performed to detect a presence of one or more of receivers 112 and 132.

At a process 730, the transmitter power $P_{TX}$ is measured. According to FIG. 3b, the transmitter power $P_{TX}$ is measured at times 344 and 350 based on scan 306 of the minimum frequency 308. As noted, the transmitter power $P_{TX}$ is compared with the threshold power or power level $P_0$. The transmitter power $P_{TX}$ being less than the power level $P_0$ may indicate the absence of one or more of receivers 112 and 132. According to FIG. 2, the transmitter power $P_{TX}$ being less than the power level $P_0$ may indicate detection 222 of an absence of one or more of receivers 112 and 132. Thus, based on the transmitter power $P_{TX}$ being less than the power level $P_0$, the method 700 returns to process 710.

Yet, the transmitter power $P_{TX}$ being greater than or equal to the power level $P_0$ may indicate a presence of one or more of receivers 112 and 132. Thus, at a process 740, based on the transmitter power $P_{TX}$ being greater than or equal to the power level $P_0$, controller 106 enters active mode 206.

Figure 8A:
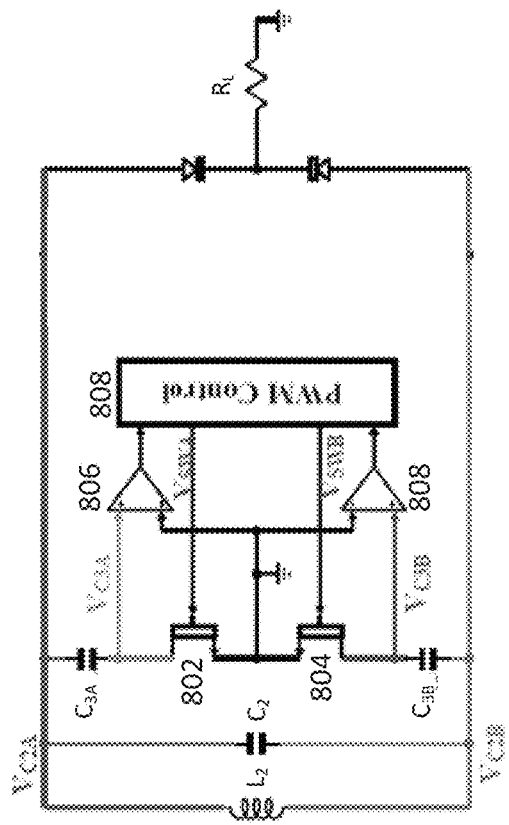
FIG. 8a is a simplified diagram of a variable tuning circuit of a receiver according to some embodiments.

FIG. 8a is a simplified diagram of a variable tuning circuit 800 according to some embodiments. According to some embodiments, circuit 800 may incorporated with one or more of receivers 112 and 132, possibly to tune resonant frequencies to transmitter frequencies in the frequency range 308-310. Inductor ($L_2$) and capacitor ($C_2$) are configured in parallel, and coupled to capacitor ($C_{3A}$), as shown with a node voltage ($V_{C2A}$). Capacitor ($C_{3A}$) is further coupled with the positive input to op amp 806 shown with a node voltage ($V_{C3A}$) and the drain of transistor 802. The gate of transistor 802 is coupled with pulse width modulator (PWM) controller 808 and controlled with a voltage ($V_{SWA}$). The source of transistor 802 is tied to ground along with the source of transistor 804 and the negative inputs of op amps 806 and 808. The gate of transistor 804 is coupled with PWM controller 808 and controlled with voltage ($V_{SWB}$). The drain of transistor 804 is coupled with the positive input to op amp 808 shown with a node voltage ($V_{C3B}$) and capacitor ($C_{3B}$). Capacitor ($C_{3B}$) is coupled to inductor ($L_2$) and capacitor ($C_2$), as shown with a node voltage ($V_{C2B}$). Resistor ($R_L$) may correspond to the load for charging the receiver.

Figure 8B:
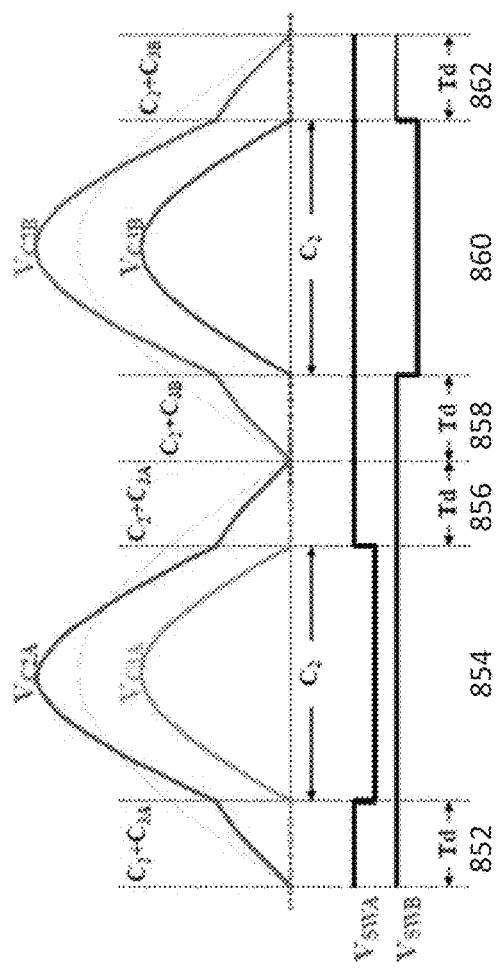
FIG. 8b is a simplified timing diagram of the variable tuning circuit according to some embodiments.

FIG. 8b is a simplified timing diagram 850 of the variable tuning circuit 800 according to some embodiments. As shown, the length of the time periods $T_D$, illustrated as time periods 852, 856, 858, and 862, may adjust the resonant frequency of the variable tuning circuit 800. At time period 852 ($T_D$), shown at the beginning of the first half cycle, voltage ($V_{SWA}$) and voltage ($V_{SWB}$) from PWM controller 808 are both high, thereby connecting capacitor ($C_2$) and capacitor ($C_{3A}$) in parallel. As shown, voltage ($V_{C2A}$) is increasing in time period 852. At time period 854, voltage ($V_{SWA}$) from PWM controller 808 is turned low, causing voltage ($V_{C2A}$) and voltage ($V_{C3A}$) to modulate with the discharging capacitor ($C_2$), where the voltage ($V_{C2B}$) is low. At time period 856 ($T_D$), shown at the end of the first half cycle, voltage ($V_{SWA}$) is turned high, thereby connecting capacitor ($C_2$) and capacitor ($C_{3A}$) in parallel. As shown, voltage ($V_{C2A}$) is decreasing in time period 852.

At time period 858 ($T_D$), shown at the beginning of the second half cycle, voltage ($V_{SWA}$) and voltage ($V_{SWB}$) from PWM controller 808 remain high, thereby connecting capacitor ($C_2$) and capacitor ($C_{3B}$) in parallel. As shown, voltage ($V_{C2B}$) is increasing in time period 858. At time period 860, voltage ($V_{SWB}$) from PWM controller 808 is turned low, causing voltage ($V_{C2B}$) and voltage ($V_{C3B}$) to modulate with the discharging capacitor ($C_2$), where voltage ($V_{C2A}$) is low. At time period 862 ($T_D$), shown at the end of the second half cycle, voltage ($V_{SWB}$) from PWM controller 808 is turned high, thereby connecting capacitor ($C_2$) and capacitor ($C_{3B}$) in parallel. As shown, voltage ($V_{C2B}$) is decreasing in time period 852.

As noted, the length of the time periods $T_D$, shown as time periods 852, 856, 858, and 862, may adjust the resonant frequency of the variable tuning circuit 800, possibly implemented with one or more of the receivers 112 and/or 132 described above. In particular, lengthening the time periods $T_D$ may cause the resonant frequency to be lowered. Further, shortening the time periods $T_D$ may cause the resonant frequency to increase. As such, by adjusting the time periods $T_D$, the resonant frequencies may be tuned to the transmitter frequency accordingly.

Some examples of controllers, such as controller 106 and the PWM controller 808, may include non-transient, tangible, machine readable media that include executable code that when run by one or more processors may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Notably, various embodiments described above have a number of advantages over conventional systems and circuitry. For example, according to FIGS. 1a and 1b, one or more of receivers 112 and 132 are simplified beyond those in conventional systems and circuits. Further, the foreign object detection is performed by transmitter 102 to further maintain the simplicity of the receivers 112 and 132. For example, conventional systems may involve complexities and further complications, possibly hindering market adoption. In particular, chipsets utilizing wireless communications may create additional cost adders to the overall system. For example, chipsets involving communications in the 3.400-3.4835 GHz range, such as BLUETOOTH LE, may increase such costs. Yet further, conventional systems may require crystal oscillators (6.78 MHz) at the transmitter and in some instances, also with receivers to provide the required coupling accuracy. Such cost adders may be justifiable in limited applications, such as those involving higher power levels, e.g., in the 15-30 W power ranges. Yet, higher power levels may cause electromagnetic interference and possible health affects to consumers. In addition, the required crystal oscillators noted above may interfere with other electronics such as displays, display drivers, and/or pacemakers, among other electronic devices.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A wireless power transfer system, comprising:
   a transmitter; and
   a controller coupled to the transmitter, wherein the controller is configured to perform operations comprising:
   causing the transmitter to scan a frequency range between a minimum frequency and a maximum frequency, wherein corresponding receivers respond to power at frequencies within the frequency range;
   periodically causing the transmitter to scan outside the frequency range by a predetermined margin, wherein the corresponding receivers do not respond to power outside of the frequency range;
   determining one or more detections based at least on the scan of the frequency range and the scan outside the frequency range to determine the presence of one or more corresponding receivers and foreign objects; and determining one or more further operations based at least on the one or more detections.

2. The wireless power transfer system of claim 1, wherein the one or more detections comprises a detection of one or more of the corresponding receivers based at least on the frequency range scanned, and wherein determining the one or more further operations comprises determining an operation to charge the one or more of the corresponding receivers based on an electromagnetic field generated by the transmitter.

3. The wireless power transfer system of claim 1, wherein the one or more detections comprises a detection of an absence of one or more of the corresponding receivers based at least on the frequency range scanned, wherein determining the one or more further operations comprises determining an operation to terminate the scan of the frequency range in the absence of the corresponding receivers.

4. The wireless power transfer system of claim 3, wherein the one or more further operations comprises causing the transmitter to periodically scan the frequency range for the one or more corresponding receivers based at least on a rest period.

5. The wireless power transfer system of claim 1, wherein the periodic scan of the frequency outside of the frequency range causes the corresponding receivers to disconnect from an electromagnetic field generated by the transmitter.

6. The wireless power transfer system of claim 1, wherein the controller is configured to perform further operations comprising:

measuring a power associated with the transmitter based on the periodic scan of the frequency outside of the frequency range, wherein determining the one or more further operations comprises determining a sleep mode based at least on the transmitter power measured.

7. The wireless power transfer system of claim 6, wherein the one or more detections comprises a detection of a foreign object based at least on the power measured at a frequency outside of the frequency range, and wherein determining the sleep mode is based further on the foreign object detected.

8. A wireless power transfer circuit, comprising:

a transmitter comprising a transmitter coil; and a controller coupled to the transmitter, wherein the controller is configured to perform operations comprising:

causing the transmitter coil to scan a frequency range that comprises a minimum frequency and a maximum frequency, wherein corresponding receivers respond to power within the frequency range;

periodically causing the transmitter to scan a frequency outside the frequency range by a predetermined margin, wherein the corresponding receivers do not respond to power outside of the frequency range;

determining one or more detections based at least on the scan of the frequency range and the scan outside frequency range to determine the presence of one or more corresponding receivers and foreign objects; and transitioning to one or more modes based at least on the one or more detections.

9. The wireless power transfer circuit of claim 8, wherein the periodic scan outside the frequency range causes the corresponding receivers to disconnect from an electromagnetic field generated by the transmitter coil.

10. The wireless power transfer circuit of claim 8, wherein the minimum frequency is approximately 80 kHz, wherein the maximum frequency is approximately 100 kHz, and wherein the frequency outside of the frequency range is approximately 70 kHz.

11. The wireless power transfer circuit of claim 8, wherein the controller is configured to perform further operations comprising:

measuring a power associated with the transmitter based at least on the periodic scan of a frequency outside of the frequency range;

determining a comparison of the power measured with a threshold power, and wherein transitioning to the one or more modes comprises transitioning to a sleep mode based at least on the comparison.

12. The wireless power transfer circuit of claim 11, wherein the power measured is further based on scanning below the minimum frequency, and wherein the one or more detections comprises a detection of a foreign object based at least on the power measured being greater than or equal to the threshold power.

13. The wireless power transfer circuit of claim 8, wherein transitioning to the one or more modes comprises transitioning to a sleep mode, and wherein the controller is configured to perform further operations comprising:

measuring a power associated with the transmitter based at least on a periodic scan below the minimum frequency; and detecting a foreign object based at least on a comparison of the power measured with a threshold power; and continuing in the sleep mode based at least on detecting the foreign object.

14. The wireless power transfer circuit of claim 8, wherein transitioning to the one or more modes comprises transitioning to a sleep mode, and wherein the controller is configured to perform further operations comprising:

measuring a power associated with the transmitter based at least on a periodic scan within the frequency range; and detecting an absence of one or more receivers based at least on a comparison of power measured with a threshold power; and continuing in the sleep mode based at least on detecting the absence.

15. A method of detection for a wireless power transfer, comprising:

scanning, by a transmitter, a frequency range comprising a minimum frequency and a maximum frequency, wherein corresponding receivers respond to power within the frequency range;

periodically scanning to a frequency outside of the frequency range, wherein the corresponding receivers do not respond to power outside of the frequency range;

determining one or more detections associated with one or more receivers based at least on scanning the frequency range and the frequency outside the frequency range to determine the presence of one or more corresponding receivers and foreign objects; and transitioning to one or more modes based at least on the one or more detections.

16. The method of claim 15, wherein the one or more detections comprises a detection of the corresponding receivers based at least on the frequency range scanned, and wherein transitioning to the one or more modes comprises transitioning to an active mode to charge one or more of the corresponding receivers with an electromagnetic field generated based at least on the frequency range scanned.

17. The method of claim 15, wherein the one or more detections comprises a detection of an absence of corresponding receivers, wherein transitioning to the one or more modes comprises transitioning to a sleep mode to terminate the scan.

18. The method of claim 15,
wherein measuring a transmitter power based at least on periodically scanning to the frequency outside of the frequency range, wherein transitioning to the one or more modes comprises transitioning to a sleep mode based at least on the transmitter power measured.

19. The method of claim 18, wherein the one or more detections are determined based further on the transmitter power measured at frequencies outside of the frequency range, wherein the one or more detections comprises a detection of a foreign object, and wherein transitioning to the one or more modes comprises transitioning to a sleep mode.

20. The method of claim 15, wherein transitioning to the one or more modes comprises transitioning to a sleep mode, the method further comprising:
measuring a power associated with the transmitter based at least on frequencies outside of the frequency range;
determining a comparison of the power measured with one or more threshold powers; and
continuing in the sleep mode based at least on the comparison.

* * * * *